United States Patent [19]

Ruiz

[11] Patent Number: 5,605,369
[45] Date of Patent: Feb. 25, 1997

[54] PROTECTIVE COVER FOR VEHICLES

[76] Inventor: Jose J. Ruiz, 1924 W. Vermont, Phoenix, Ariz. 85015

[21] Appl. No.: 546,393

[22] Filed: Oct. 20, 1995

[51] Int. Cl.$^6$ ........................................................ B60J 9/00
[52] U.S. Cl. ........................................ 296/136; 150/166
[58] Field of Search ................................... 296/77.1, 95.1, 296/136; 293/128; 280/770; 150/166, 168

[56] References Cited

U.S. PATENT DOCUMENTS

| | | | |
|---|---|---|---|
| 4,531,560 | 7/1985 | Balanky | 293/128 X |
| 4,589,459 | 5/1986 | Lantrip | 296/136 X |
| 4,938,522 | 7/1990 | Herron et al. | 296/136 |
| 5,209,545 | 5/1993 | Slaugh | 296/136 |
| 5,217,275 | 6/1993 | Ridge | 296/136 X |
| 5,497,819 | 3/1996 | Chiang | 296/136 X |

*Primary Examiner*—Andrew C. Pike
*Attorney, Agent, or Firm*—Meschkow & Gresham, P.L.C.

[57] ABSTRACT

A protective cover for a vehicle includes a main section, a door section, and a secondary section. The vehicle may be operated when the protective cover is installed upon the vehicle. The door section is secured to the vehicle door with a drawstring that is tightened around the perimeter of the door. The door section includes a door handle access panel and a sideview mirror opening. The protective cover includes window screen elements that cover the vehicle windows and light fixture screen elements that cover the vehicle headlights and taillights. The protective cover also includes a flap section that covers the door seam formed around the door and a second flap section that covers the seam formed between different body sections of the vehicle.

17 Claims, 2 Drawing Sheets

PROTECTIVE COVER FOR VEHICLES

BACKGROUND OF THE INVENTION

1. Field of the Invention

The present invention relates generally to protective covers for vehicles. More particularly, the present invention relates to a protective cover that protects the vehicle finish against damage caused by road debris while the vehicle is being operated.

2. The Prior Art

A variety of products are designed to protect and preserve the exterior surfaces of vehicles. For example, a car cover is often used to shield a vehicle finish from rain, dirt, or sunlight when the vehicle is parked or placed in storage. Unlike most car covers, an automobile "bra" may be utilized to reduce the amount of damage caused by rocks and other road debris while the vehicle is being driven. A typical bra is often designed to only protect the front section of the vehicle, i.e., a portion of the hood and the fenders. Nevertheless, a properly designed conventional bra may provide adequate protection when the vehicle is driven on a paved road, a modern highway, or in other ordinary environments.

Due to the limited surface coverage of most automobile bras, they are not desirable for use in off-road or other recreational driving situations. During rigorous off-road driving, the entire body of the vehicle may be exposed to dirt, rocks, tree branches, and other objects that can scratch, chip, or otherwise damage the vehicle paint. Accordingly, a full-bodied cover is desirable to effectively protect the vehicle finish in such conditions.

A full-body vehicle cover may not be convenient to use unless it allows easy entry and exit into the vehicle. A few car covers (not normally intended for use while the vehicle is operated) include zippered door panels that provide access into the vehicle. Such door panels are typically not designed to be closed from inside of the vehicle, and they inherently must be manipulated each time the door is opened and closed.

Off-road use often covers the vehicle with dirt, mud, and debris. Consequently, debris typically collects in "pockets" and "seams" formed at various locations around the body of the vehicle. For example, rocks and dirt may collect in the seams surrounding the vehicle doors. Debris that collects at this location may fall onto the passengers or into the vehicle interior when the doors are opened. At the very least, this falling debris can be a troublesome nuisance for the off-road enthusiast.

SUMMARY OF THE INVENTION

Accordingly, it is an advantage of the present invention that an improved protective cover for use with a vehicle is provided.

Another advantage of the present invention is that a full-bodied protective cover suitable for use in harsh driving environments is provided.

A further advantage is that a user can conveniently enter and exit the vehicle when the protective cover is installed upon the vehicle.

Another advantage of the present invention is that the protective cover reduces the collection of dirt and debris within the seams surrounding the doors of the vehicle.

The above and other advantages of the present invention are carried out in one form by a protective cover having a main section configured to substantially cover the body of a vehicle, a door section coupled to the main section and configured to substantially cover a door of the vehicle, and means for covering a seam formed between the door and the body. The seam covering means is attached to the door section, and the protective cover is configured to allow the door to operate when the protective cover is installed upon the vehicle.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENT

Figure 1:
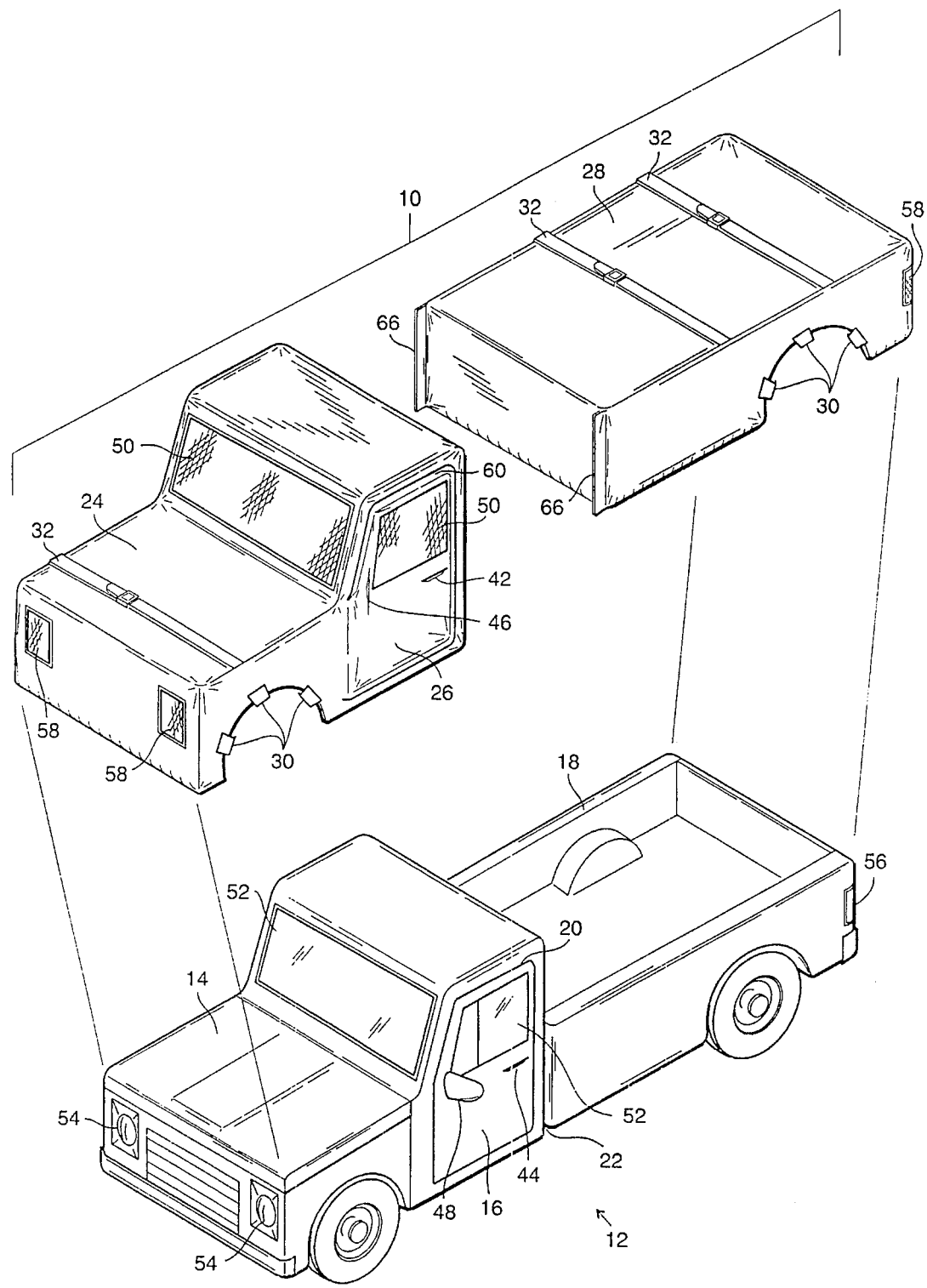
FIG. 1 is an exploded perspective view of a vehicle with an exemplary protective cover according to the preferred embodiment of the present invention.

Referring to FIG. 1, a protective cover 10 according to the preferred embodiment of the present invention is shown along with a vehicle 12 upon which protective cover 10 may be installed. Although vehicle 12 is depicted as a truck throughout the Figures, the present invention may be adapted to fit a variety of different body styles.

Vehicle 12 includes a main body 14, a door 16, and a secondary body 18. A door seam 20 is formed between main body 14 and door 16 when door 16 is closed. A secondary seam 22 is formed between main body 14 and secondary body 18. Those skilled in the art will recognize that main body 14 for the truck shown in FIG. 1 includes the hood, the front fenders, and the passenger cab, and secondary body 18 includes the rear fenders and the truck bed. In addition, vehicle 12 may include any number of doors 16 with a corresponding number of door seams 20.

Protective cover 10 is configured such that vehicle 12 may be operated as usual when protective cover 10 is installed. Protective cover 10 protects the exterior finish of vehicle 12 in off-road or other harsh environments. As such, protective cover 10 is preferably constructed from a material having sufficient thickness and ruggedness to protect vehicle 12 against damage caused by rocks, branches, and other debris. According to the preferred embodiment of the present invention, protective cover 10 shields most of the outer surface of vehicle 12.

Generally, protective cover 10 includes a main section 24, a door section 26, and a secondary section 28. Main section 24 is configured to substantially cover main body 14, door section 26 is configured to substantially cover door 16, and secondary section 28 is configured to substantially cover secondary body 18.

Each of sections 24, 26, and 28 are preferably shaped to approximately follow the exterior contours of main body 14, door 16, and secondary body 18, respectively. For the sake of clarity and brevity, the description of door section 26 is intended to apply to any number of doors that vehicle 12 may have.

To facilitate fastening protective cover 10 onto vehicle 12, main section 24 and secondary section 28 may include a plurality of hooks 30 coupled thereto. Each of hooks 30 is configured to engage with a corresponding mounting location (not shown) on vehicle 12. For example, the mounting locations may be positioned around the wheel wells, under the chassis, or under the bumpers. Those skilled in the art will appreciate that protective cover 10 may employ equivalent elements to fasten protective cover 10 onto vehicle 12, such as snaps, drawstrings, or the like.

To ensure that protective cover 10 fits snugly upon vehicle 12, a number of tie straps 32 may also be coupled to main section 24 or secondary section 28. Tie straps 32 are preferably configured such that the size of protective cover 10 is selectively adjustable. In other words, tie straps 32 may be utilized to remove excess slack in protective cover 10. Thus, when tie straps 32 and hooks 30 are cooperatively employed, protective cover 10 fits tightly and securely onto vehicle 12.

According to an alternate embodiment of the present invention, protective cover 10 is formed from a suitable material such that it "stretch fits" around vehicle 12. If protective cover 10 is sized to fit the specific type of vehicle 12, then protective cover 10 forms a taut outer skin around vehicle 12. As such, hooks 30 and tie straps 32 need not (but may) be utilized with this embodiment.

Door section 26 is coupled to main section 24 such that door 16 can operate when protective cover 10 is installed upon vehicle 12. Those skilled in the art will appreciate that door section 26 may either be a separate section that attaches to main section 24 or an integral portion of main section 24. Door section 26 is preferably secured to door 16 such that it does not restrict the operation of door 16.

Figure 2:
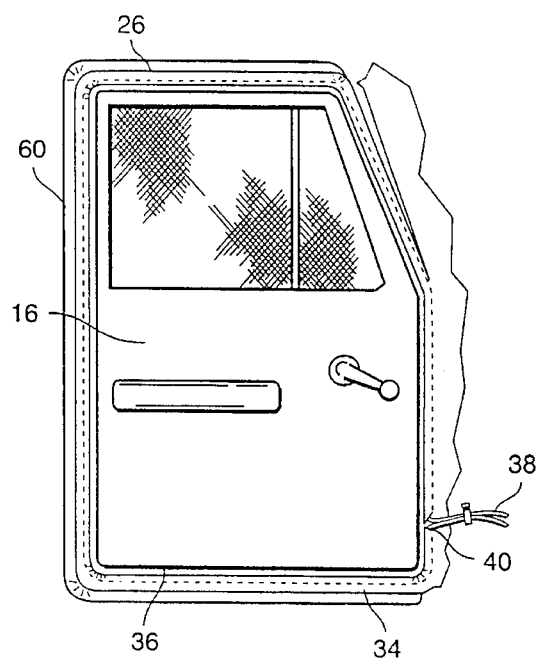
FIG. 2 is an elevation view of the interior side of an opened door of the vehicle with the protective cover installed thereon.

Referring to FIG. 2, door section 26 preferably includes a perimetrical edge 34 configured to be located proximate an interior surface 36 of door 16. Perimetrical edge 34 carries a drawstring 38 that is configured to tighten perimetrical edge 34 against interior surface 36 of door 16. In the preferred embodiment, draw string 38 is gathered at a point 40 proximate the lower front portion of door 16. After securing door section 26 around door 16, the exposed portion of drawstring 38 may be collected and tucked away underneath door section 26 or placed in any other suitable location.

Figure 3:
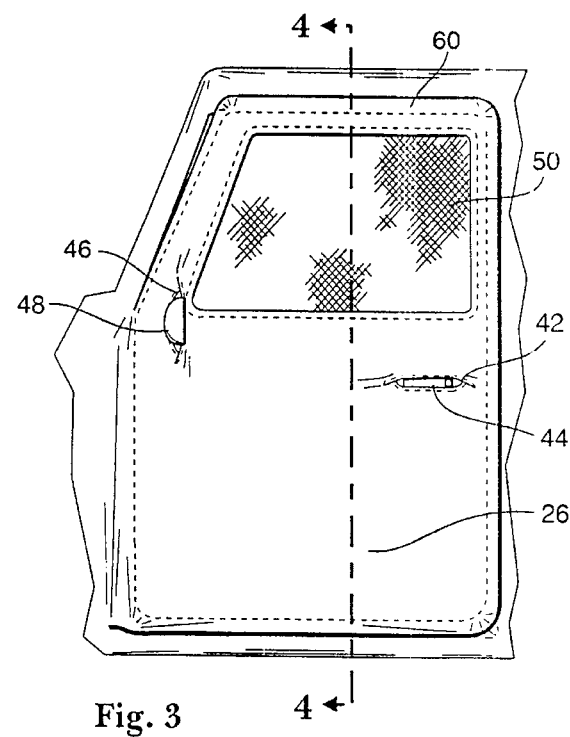
FIG. 3 is an elevation view of the exterior side of a closed door of the vehicle with the protective cover installed thereon.

Referring to FIGS. 1 and 3, door section 26 preferably includes an access panel 42 formed therein. When protective cover 10 is installed, access panel 42 is located proximate a door handle 44 of vehicle 12. Access panel 42 is configured to selectively cover door handle 44 such that door handle 44 may be engaged when necessary to open door 16. For example, access panel 42 may be configured as an overlapping flap assembly that incorporates snaps, a zipper, or other closure device. Alternatively, access panel 42 may be configured as a slit formed within door section 26 (as shown in FIG. 3). Of course, those skilled in the art will recognize that the precise location and configuration of access panel 42 may vary from application to application.

In addition to access panel 42, door section 26 may also include a sideview mirror opening 46 formed therein. Sideview mirror opening 46 is preferably configured to allow a sideview mirror 48 to extend through door section 26. Thus, the driver's view of sideview mirror 48 is not obstructed by door section 26. As with access panel 42, the size and location of sideview mirror opening 46 may differ according to the specific application.

Protective cover 10 may also include a plurality of window screen elements 50 adapted to substantially cover a corresponding plurality of windows 52. Window screen elements 50 are preferably configured to provide an occupant of vehicle 12 with a substantially unobstructed view through windows 52. For example, window screen elements 50 may be constructed from a mesh or a net material that is sufficiently "transparent" to facilitate safe driving. A net may be particularly desirable to allow air to flow through one or more of windows 52, such as the side roll-up windows. Because the front of vehicle 12 is most likely to be struck by rocks and other debris, it may be desirable to utilize a substantially transparent plastic sheet or film to cover the windshield.

To protect the headlights 54 and the taillights 56 of vehicle 12, protective cover 10 may also include a plurality of light fixture screen elements 58. Light fixture screen elements 58 are preferably configured to substantially cover headlights 54 and taillights 56. To maintain the operability of headlights 54 and taillights 56, light fixture screen elements 58 are translucent to light emitted from headlights 54 and taillights 56. Accordingly, light fixture screen elements 58 may be formed from a variety of suitable materials, including a mesh, a net, or a translucent plastic sheet (see the above description of window screen elements 50).

Figure 4:
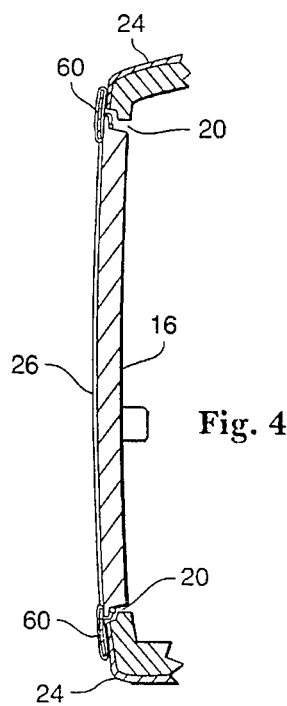
FIG. 4 is a sectional view of the closed door as viewed along the line 4—4 shown in FIG. 3.
Figure 5:
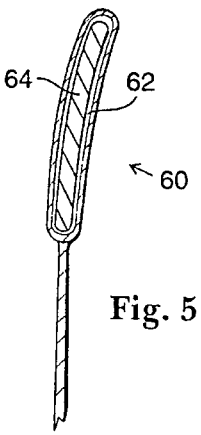
FIG. 5 is a detailed sectional view of a flap section of the protective cover.

According to one aspect of the preferred embodiment, protective cover 10 includes a flap section 60 adapted to cover door seam 20 when door 16 is closed. FIG. 4 shows a cross-sectional view of door section 26 installed upon door 16. FIG. 5 shows a detailed cross-sectional view of flap section 60. Flap section 60 is preferably attached to door section 26 proximate perimetrical edge 34 (see FIGS. 2–3). This preferred attachment location enables flap section 60 to overlap main section 24 when door 16 is closed.

Flap section 60 is preferably constructed from a loop of material that forms an interior pocket 62 within flap section 60. A reinforcing member 64 may be located within interior pocket 62 to provide structural rigidity to flap section 60. Reinforcing member 64 may be formed from a strip of plastic, a sheet of metal, or any other suitable material. Reinforcing member 64 is preferably configured to provide an amount of resilient tension between flap section 60 and main body 14 when door 16 is closed. In other words, reinforcing member 64 cooperates with flap section 60 such that flap section 60 contacts main section 24 when door 16 is closed. As such, flap section 60 creates a "seal" between door 16 and main body 14 that substantially prevents dirt and debris from accumulating within door seam 20.

Protective cover 10 may also include a second flap section 66 configured to cover secondary seam 22 (see FIG. 1). The construction of second flap section 66 is substantially similar to the construction of flap section 60; therefore the above description of flap section 60 should be referred to. If secondary seam 22 is formed between two stationary body parts (such as a passenger cab and a truck bed), then second flap section 66 may be a removable section that affixes to protective cover 10 as needed.

For example, second flap section 66 may be removably attachable to secondary section 28 via snaps, zippers, or hook and loop fasteners. Alternatively, second flap section 66 may be configured to press fit directly into secondary seam 22. According to an alternate embodiment (shown in FIG. 1), second flap section 66 is attached to secondary section 28 in the manner described above in connection with flap section 60 and door section 26.

In either embodiment, second flap section 66 is adapted to overlap main section 24 such that secondary seam 22 does not collect an undesirable amount of dirt and debris. In yet another embodiment, second flap section 66 is attached to main section 24 and is configured to overlap secondary section 28. Of course, any number of second flap sections 66 may be employed depending upon the body style of vehicle 12 and the amount of protection desired.

In summary, the present invention provides an improved protective cover for use with a vehicle. The protective cover is preferably a full-bodied design that is suitable for use in harsh driving environments. An occupant of the vehicle can conveniently enter and exit the vehicle when the protective cover is installed upon the vehicle. In addition, the protective cover reduces the accumulation of dirt and debris within the seams surrounding the doors of the vehicle.

The above description is of a preferred embodiment of the present invention, and the invention is not limited to the specific embodiment described and illustrated. For example, the protective cover may be configured to be compatible with a variety of vehicle body styles having any number of doors, body sections, and body seams. In addition, the present invention is not limited to the full-bodied embodiment, and various sections and elements may be omitted to suit individual needs. Furthermore, many variations and modifications will be evident to those skilled in this art, and such variations and modifications are intended to be included within the spirit and scope of the invention, as expressed in the following claims.

What is claimed is:

1. A protective cover for a vehicle having a body having an exterior contour, a door attached to said body and having an exterior contour and a perimeter, and a seam formed between said body and said door when said door is closed, said protective cover comprising:

a main section configured to substantially cover said body, said main section being shaped to approximately follow the exterior contour of said body;

a door section coupled to said main section and configured to substantially cover said door, said door section being shaped to approximately follow the exterior contour of said door; and a flap section for covering said seam, said flap section being attached to said door section, and adapted to be located proximate the perimeter of said door and to overlap said main section when said door is closed; wherein said protective cover is configured to allow said door to operate when said protective cover is installed upon said vehicle.

2. A protective cover according to claim 1, wherein:

said flap section includes an interior pocket formed therein;

said protective cover further comprises a reinforcing member located within said interior pocket; and said reinforcing member cooperates with said flap section such that said flap section contacts said main section when said door is closed.

3. A protective cover according to claim 1, wherein:

said door section includes a perimetrical edge configured to be located proximate an interior surface of said door; and said protective cover further comprises means for securing said perimetrical edge to said door.

4. A protective cover according to claim 3, wherein:

said means for securing comprises a drawstring carried by said door section; and said drawstring is configured to tighten said perimetrical edge against said interior surface of said door.

5. A protective cover according to claim 1, further comprising a screen element adapted to substantially cover a window of said vehicle, said screen element being configured to provide an occupant of said vehicle with a substantially unobstructed view through said window.

6. A protective cover according to claim 1, wherein said main section includes a screen element adapted to substantially cover a light fixture of said vehicle, said screen element being translucent to light emitted from said light fixture.

7. A protective cover according to claim 1, wherein said door section further comprises an access panel formed therein, said access panel being configured to selectively cover a door handle of said vehicle.

8. A protective cover for a vehicle having a main body, said main body having an exterior contour, a door having an exterior contour attached to said main body, a secondary body attached to said main body, and a seam formed between said main body and said secondary body, said protective cover comprising:

a main section configured to substantially cover said main body, said main section being shaped to approximately follow the exterior contour of said main body;

a door section coupled to said main section and configured to substantially cover said door, said door section being shaped to approximately follow the exterior contour of said door;

a secondary section configured to substantially cover an outer surface of said secondary body, said secondary section being shaped to approximately follow a contour of said outer surface;

a flap section attached to said cover for covering said seam, said flap section including an interior pocket formed therein; and a reinforcing member located within said interior pocket, said reinforcing member cooperating with said flap section such that said flap section contacts at least one of said main and said secondary sections; wherein said protective cover is configured to allow said door to operate when said protective cover is installed upon said vehicle.

9. A protective cover according to claim 8, wherein:

said door section includes a perimetrical edge configured to be located proximate an interior surface of said door;

said protective cover further comprises a drawstring carried by said door section; and said drawstring is configured to tighten said perimetrical edge against said interior surface of said door.

10. A protective cover according to claim 8, further comprising a door flap section attached to said door section, said door flap section being adapted to overlap said main section when said door is closed.

11. A protective cover according to claim 10, wherein:

said door flap section includes a door interior pocket formed therein;

said protective cover further comprises a door reinforcing member located within said door interior pocket; and said door reinforcing member cooperates with said door flap section such that said door flap section contacts said main section when said door is closed.

12. A protective cover for a vehicle having a body having an exterior contour and a door having an exterior contour attached to said body, said protective cover comprising:

a main section configured to substantially cover said body, said main section being shaped to approximately follow the exterior contour of said body;

a door section coupled to said main section and configured to substantially cover said door and to approximately follow the exterior contour of said door, said door section having a perimetrical edge configured to be located proximate an interior surface of said door; and a drawstring carried by said door section and configured to tighten said perimetrical edge against said interior surface of said door; wherein said protective cover is configured to allow said door to operate when said protective cover is installed upon said vehicle.

13. A protective cover according to claim 12, further comprising a flap section attached to said door section, said flap section being adapted to cover a seam formed between said body and said door when said door is closed, and said flap section being adapted to overlap said main section when said door is closed.

14. A protective cover according to claim 13, wherein:

said flap section includes an interior pocket formed therein;

said protective cover further comprises a reinforcing member located within said interior pocket; and said reinforcing member cooperates with said flap section such that said flap section contacts said main section when said door is closed.

15. A protective cover according to claim 12, further comprising means for fastening said protective cover onto said vehicle.

16. A protective cover according to claim 15, wherein said means for fastening comprises a plurality of hooks coupled to said protective cover, said hooks being configured to engage with mounting locations on said vehicle.

17. A protective cover according to claim 12, further comprising at least one tie strap coupled to said main section, said at least one tie strap being configured such that size of said protective cover is selectively adjustable.

* * * * *